United States Patent [19]
Ishii et al.

[11] Patent Number: 5,649,750
[45] Date of Patent: Jul. 22, 1997

[54] COMPUTER HAVING SIDE-LOADABLE SLIDE-IN BATTERY AND DUAL LATCHING MECHANISM

[75] Inventors: Shigeru Ishii, Hadano; Mitsuo Horiuchi, Sagamihara; Wataru Yoshikawa, Fujisawa, all of Japan

[73] Assignee: International Business Machines Corporation, Armonk, N.Y.

[21] Appl. No.: 546,043

[22] Filed: Oct. 20, 1995

[30] Foreign Application Priority Data

Oct. 25, 1994 [JP] Japan .................. 6-260141

[51] Int. Cl.⁶ .................................... H01M 2/10
[52] U.S. Cl. .................. 312/223.2; 312/319.1; 292/219; 361/683; 361/727; 439/500; 429/97
[58] Field of Search .............. 312/223.2, 223.1, 312/319.1; 292/219, 228; 361/683, 725, 726, 727, 732, 740, 759, 801, 684; 364/708.1; 429/96, 97, 98, 99, 100; 439/500

[56] References Cited

U.S. PATENT DOCUMENTS

| | | | |
|---|---|---|---|
| 4,146,682 | 3/1979 | Nakao | 429/97 |
| 4,586,761 | 5/1986 | Shimbara | 312/319.1 |
| 4,596,427 | 6/1986 | Pflugfelder | 312/319.1 |
| 5,208,116 | 5/1993 | Joh | 429/96 |
| 5,220,520 | 6/1993 | Kessoku | 361/684 |
| 5,224,870 | 7/1993 | Weaver et al. | 429/97 X |
| 5,225,293 | 7/1993 | Mitchell et al. | 429/97 |
| 5,251,105 | 10/1993 | Kobayashi et al. | 361/683 |

FOREIGN PATENT DOCUMENTS 428483  3/1992  Japan .

*Primary Examiner*—Peter M. Cuomo
*Assistant Examiner*—Janet M. Wilkens
*Attorney, Agent, or Firm*—Martin J. McKinley

[57] ABSTRACT

A battery compartment latch mechanism holds a battery in either a fully loaded or a partially loaded position. The partially loaded position prevents the battery from slipping out of the battery compartment when the battery is being ejected. To hold the battery in the fully loaded position, a latch (66) at one end of a lever (60) is urged by a cantilever spring (72) into engagement with a battery recess (50). To disengage the latch from the recess, the lever is rotated manually by moving a handle (84) located at another end of the lever. As the battery is being withdrawn, a plunger (90) engages the battery recess to prevent the battery from slipping out. To fully remove the battery, the user forcibly urges the battery out of the compartment. Because the side walls (104) of the plunger are sloped, forcing the battery outward causes the plunger to be depressed, thereby disengaging the plunger from the battery recess. Thus, even if the battery is being ejected when the battery compartment is in an inclined or non-horizontal position, the battery does not fall out of the compartment.

4 Claims, 6 Drawing Sheets

COMPUTER HAVING SIDE-LOADABLE SLIDE-IN BATTERY AND DUAL LATCHING MECHANISM

BACKGROUND OF THE INVENTION

Applicants claim the foreign priority benefits under 35 U.S.C. 119 of Japanese Application No. 6-260141 filed Oct. 25, 1994. This Japanese Application and its translation are incorporated into this Application by reference.

This invention pertains to battery compartment apparatus and, more particularly, to a notebook computer having a battery compartment apparatus for receiving a side-loadable, slide-in battery wherein the apparatus includes a dual latching mechanism for holding the battery in both fully loaded and partially loaded positions.

In a data processing apparatus that incorporates a mechanism whereby a battery is slid into and stored within a battery storage section that is provided in a case, a latch that is provided in the battery storage section engages a recessed portion that is formed in the battery to lock the battery in its use position.

In such a data processing apparatus, the latch is manipulated so that it disengages the recessed portion that is formed in a battery and the battery can thereafter be extracted from the battery storage section. When the latch is disengaged from the recessed portion, the weight of the battery may cause it to drop out of the battery storage section.

Especially with a portable data processing apparatus, a battery may have to be replaced with a new one while the apparatus is being held in the hands or is resting on a lap; conditions that increase the possibility that the battery may inadvertently slide out of a battery storage section and fall. Further, with a data processing apparatus that has an ejection spring, which is provided on the back wall of its battery storage section, to facilitate the removal of the battery, the battery will slide out more easily.

Accordingly, the invention described below prevents the battery from sliding out of and falling from the battery compartment after the battery has been disengaged from a fully loaded position.

SUMMARY OF THE INVENTION

Briefly, the invention is a computer for use with a side-loadable, slide-in battery. The battery has a recess in the side surface of the battery, wherein the recess includes a back wall substantially parallel to the side surface of the battery, a first side wall substantially perpendicular to the back wall, and a second side wall sloped at an obtuse angle relative to the back wall. The computer includes a housing that has a bottom surface and at least one side surface substantially perpendicular to said bottom surface. The side surface has an opening for receiving the side-loadable, slide-in battery. The computer also includes a first mechanism for holding the battery in a fully loaded position wherein the battery is fully inserted into the housing. A second mechanism is also provided for holding the battery in a partially loaded position wherein the battery is partially inserted into the housing, and partially extending out of said housing.

In another embodiment, the invention is a battery compartment apparatus for use with a battery. The battery compartment apparatus includes a first mechanism for holding the battery in a fully loaded position wherein the battery is fully inserted into the battery compartment apparatus. The battery compartment apparatus also includes a second mechanism for holding the battery in a partially loaded position wherein the battery is partially inserted into the battery compartment apparatus.

DESCRIPTION OF THE ILLUSTRATIVE EMBODIMENTS

Figure 1:
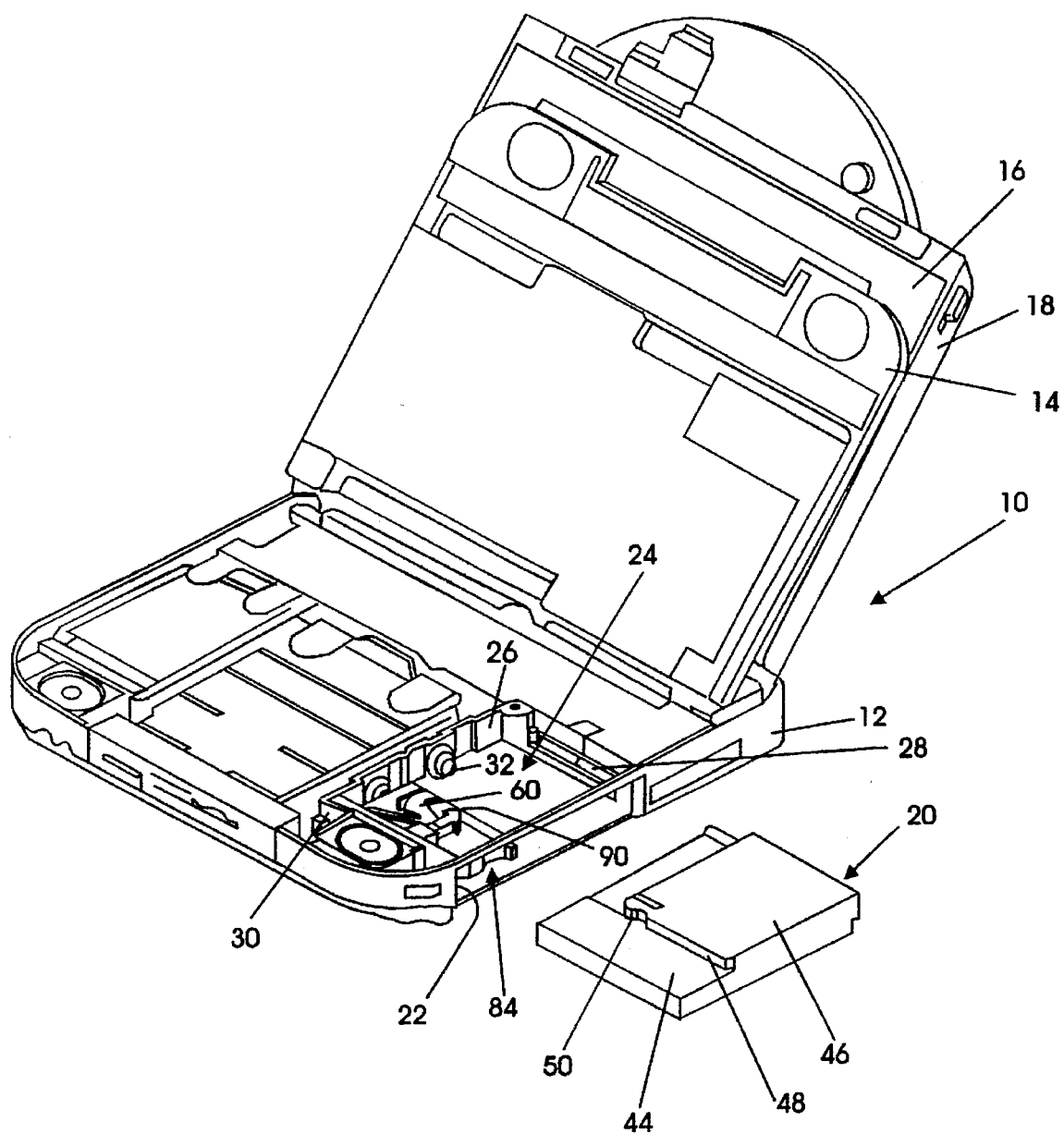
FIG. 1 is a perspective view of the internal components of a notebook computer having a side-loadable, slide-in battery and battery compartment apparatus according to one embodiment of the present invention.
Figure 2:
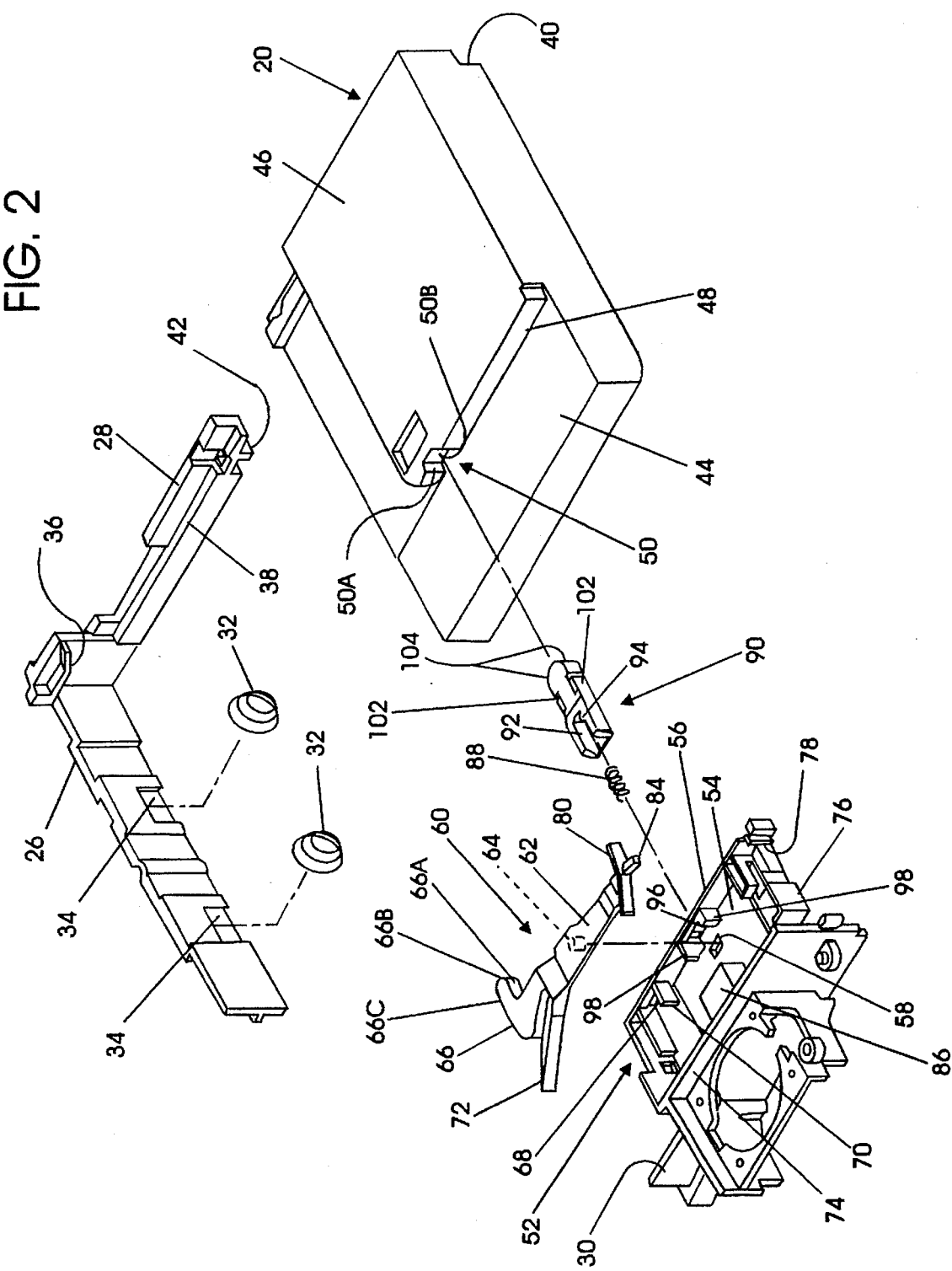
FIG. 2 is an exploded perspective view of the side-loadable, slide-in battery and battery compartment apparatus.

The personal computer 10 has a rectangular body case 12. A keyboard 14 is mounted on the top opening of the body case 12, and a cover 18, in which a display 16 is provided, is so attached that it can be opened and closed.

An insertion port 22 for a battery 20 is formed in the side wall of the body case 12, and communicates with a battery storage section 24. The insertion port 22 is designed to be shielded with a long cover 23. A lock claw 25, which projects beyond the top edge of the cover 23, is inserted into a lock hole (not shown) that is formed in the edge of the opening at the insertion port 22. Protrusions 27 extend from both longitudinal ends of the cover 23, and are employed to secure the bottom end of the cover 23 to the opening edge to the insertion port 22. A flexible claw 29 is provided on the reverse of the cover 23. When the cover 23 is pushed in the direction indicated by the arrow A, the flexible claw 29 first bends and then slides into and engages a cover retention hole (not shown).

The shape of the battery storage section 24 is defined by a back plate 26, at the rear of the battery storage section 24, and side plates 28 and 30, which extend from both ends of the back plate 26 to the insertion port 22. Wide grooves 34 that can engage the respective ends of springs 32 are formed in the back plate 26. The springs 32 that engage the grooves 34 abut upon the distal, inserted end of the battery 20 and provide the force required to push the battery 20 out of the battery storage section 24.

A retaining piece 36 extends inward longitudinally along the side plate 28 from the junction of the side plate 28 and the back plate 26. The retaining piece 36 presses down on the distal end corner of the battery 20 and prevents the battery 20 from rising while it is in use.

Further, a step 38 is provided on the side plate 28 extending in the longitudinal direction. A step 40 that is formed on the lower end of the battery 20 contacts the step 38 and guides the battery 20 as it is loaded into, or unloaded from, the battery storage section 24. An angular portion 42, which is also formed on the side plate 28 close to the insertion port 22, engages a protrusion (not shown) that projects from the side face of the battery 20 to prevent the battery 20 from rising.

The battery 20 is an almost rectangular block; with a plate shaped raised portion 46 so formed on its top surface as to describe a wide, L-shaped step face 44 in a plan view. A recessed portion 50 is formed in a side wall 48 of the raised portion 46. A wall 50A of the recessed portion 50, which is closer to the back plate 26, is perpendicular to the direction in which the battery 20 is moved. A wall 50B, which is closer to the insertion port 22, is inclined, at an angle of almost 45° to the direction in which the battery 20 is moved, in order to provide a wide front opening for the recessed portion 50.

A receptacle 52, which is open at its top, extends out, from the upper portion of the side plate 30, and above the step face 44 of the battery 20. The step face 44 of the battery 20 is guided along the bottom wall 54 of the receptacle 52, and a side face 48 of the battery 20 travels along a side wall 56 of the receptacle 52.

Figure 4:
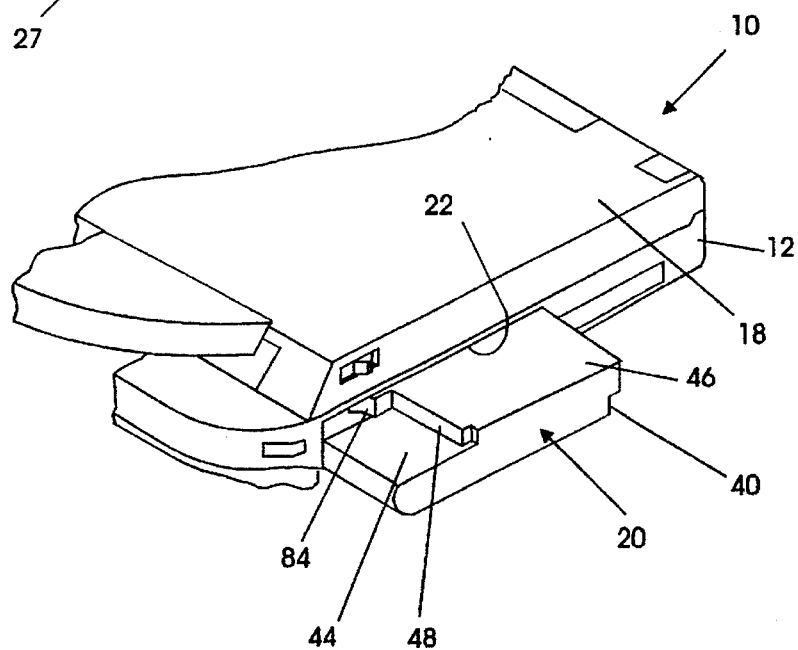
FIG. 4 is a perspective view of a portion of the notebook computer showing a side-loadable, slide-in battery approximately in the partially loaded position.
Figure 5:
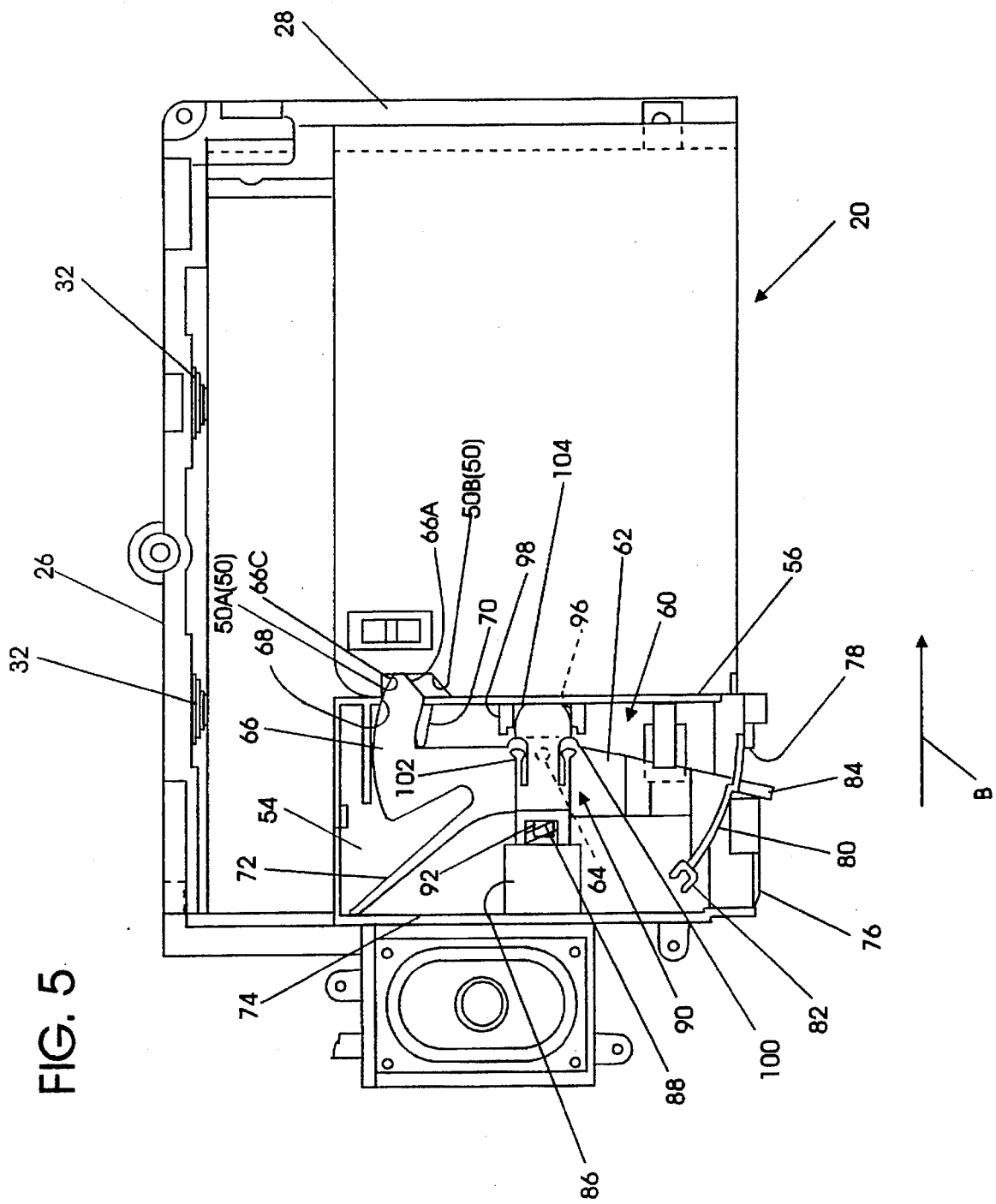
FIG. 5 is a plan view of the battery compartment apparatus and the side-loadable, slide-in battery in the fully loaded position with the latch engaged in the battery recess.

As is shown in FIGS. 4 and 5, a shaft 64, which protrudes downward from a thin plate arm 62 that constitutes the middle portion of the latch lever 60, is supported rotatable in a shaft hole 58, which is drilled in the bottom wall 54 of the receptacle 52. A thick latch portion 66, whose distal end is curved toward the battery 20, is integrally formed with the arm 62 on the side closer to the back plate 26. As the latch lever 60 is rotated, the latch portion 66 can be projected from a latch port 68, which is formed in the side wall 56 of the receptacle 52. A curved guide plate 70 is provided inside the receptacle 52 at the latch port 68, and is employed to guide a lower face 66A of the latch portion 66 and to limit the distance the latch portion 66 can be projected from the latch port 68.

An inclined face 66B, which has an inclination of almost 45° relative to the back plate 26 is formed with the distal end of the latch portion 66, can contact the face of the wall 50B of the recessed portion 50.

Further, a cantilever spring 72 that extends in a diagonal direction away from the latch portion 66 is integrally formed with the arm 62. The free end of the cantilever spring 72 abuts upon the side wall 74 of the receptacle 52, and provides the force to rotate the latch lever 60 on the shaft 64 and to urge the latch portion 66 toward the battery 20.

An operational port 78 is formed in a side wall 76 of the receptacle 52. The operational port 78 is shielded by a curved, hidden plate 80 that is positioned at the end of the arm 62. One end of the hidden plate 80 abuts upon a stopper 82 that projects upward from the bottom plate 54 of the receptacle 52 and limits the rotation of the latch lever 60.

A knob 84 extends from the surface of the hidden plate 80, and projects through the operational port 78. When the knob 84 is moved in the direction indicated by the arrow B, the latch lever 60 is rotated counterclockwise against the urging force exerted by the cantilever spring 72.

A square shaped storage box 86 is provided on the side wall 74 of the receptacle 52. A spring 88 is inserted into the storage box 86 and abuts upon the side wall 74. The distal end of the spring 88 encircles a pin 94 that projects from the upright wall of a spring recess 92 in the rear portion of the plunger 90. By pushing the plunger 90 into the storage box 86 with the spring 88 positioned as described, the plunger 90 is constantly driven in the direction in which it would be ejected from the storage box 86.

An opening 96 is formed in a side wall 56 of the receptacle 52, and a pair of guide walls 98 are provided that extend from the edges of the opening 96 to the storage box 86. The plunger 90 is guided along the guide walls 98 when it is projected from the opening 96.

Steps 100, which are formed in the ends of the guide walls 98, engage flexible toothed extensions 102, which extend longitudinally from the side of the plunger 90, in order to prevent the plunger 90 from sliding out.

The distal end of the plunger 90 is tapered, and inclined faces 104, which are inclined at an angle of about 45° relative to the storage box 86, are formed. At the inclined faces 104, the insertion force, or the withdrawal force, of the battery 20 is converted into a lateral force for driving the plunger 90 back into the receptacle 52.

In addition, as is shown in FIG. 5, since the plunger 90 is so designed that it passes over the arm 62 of the latch lever 60 and presses down the shaft 64, an additional member for pressing down the shaft 64 of the latch lever 60 is not required.

Figure 3:
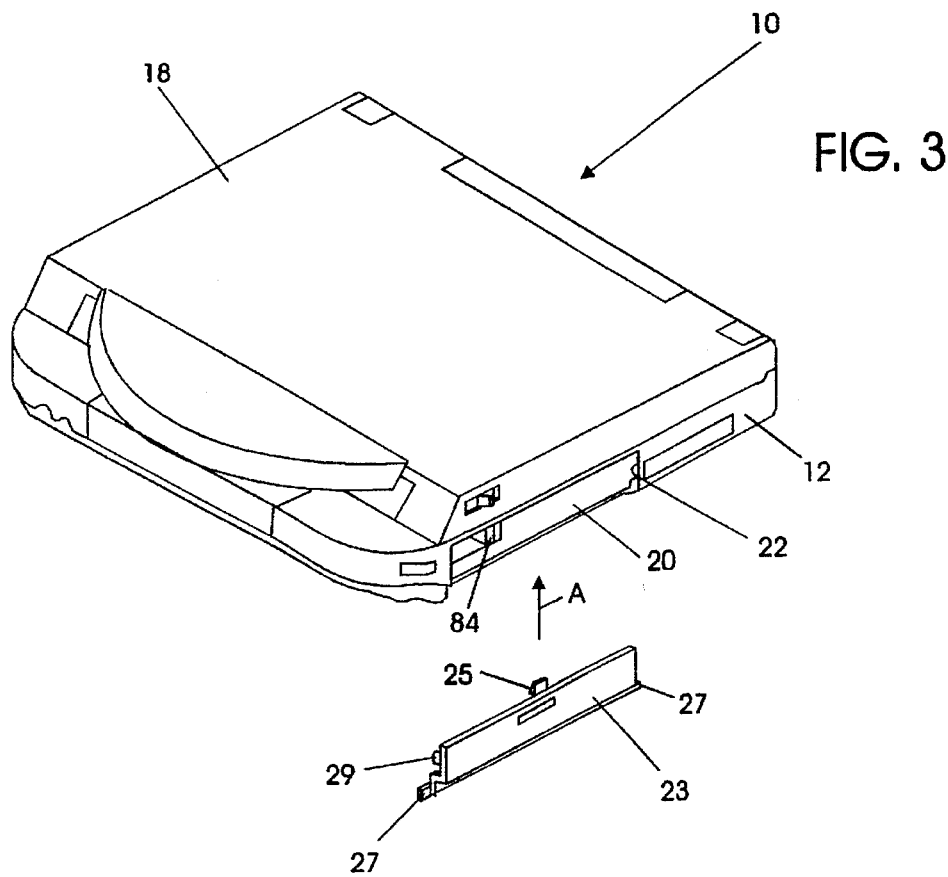
FIG. 3 is a perspective view of the external features of the notebook computer illustrating, in particular, a removable cover over the opening for the side-loadable, slide-in battery.

A mechanism for loading and unloading a battery according to the present invention will now be described. As is shown in FIG. 3, when the battery 20 is to be unloaded from the PC 10, first, the cover 23 that encloses the insertion port 22 is removed.

At this time, since, as is shown in FIG. 5, the battery 20 is forced toward the insertion port 22 by the springs 32, and as clockwise rotating force is exerted on the latch lever 60 by the cantilever spring 72, the latch portion 66 extends into and engages the recessed portion 50 and locks the battery 20 in the use position. The plunger 90, which abuts upon the side face 48 of the battery 20, is pushed back into the receptacle 52. As the wall face 50A of the recessed portion 50 is engaged by a top face 66C of the latch portion 66, the battery 20 will not be mistakenly disengaged.

When the knob 84 is shifted in the direction indicated by the arrow B, the latch lever 60 is rotated at the shaft 64 and the latch portion 66 is extracted from the recessed portion 50. Then, the battery 20 is automatically driven outward by the urging force of the spring 32.

Figure 6:
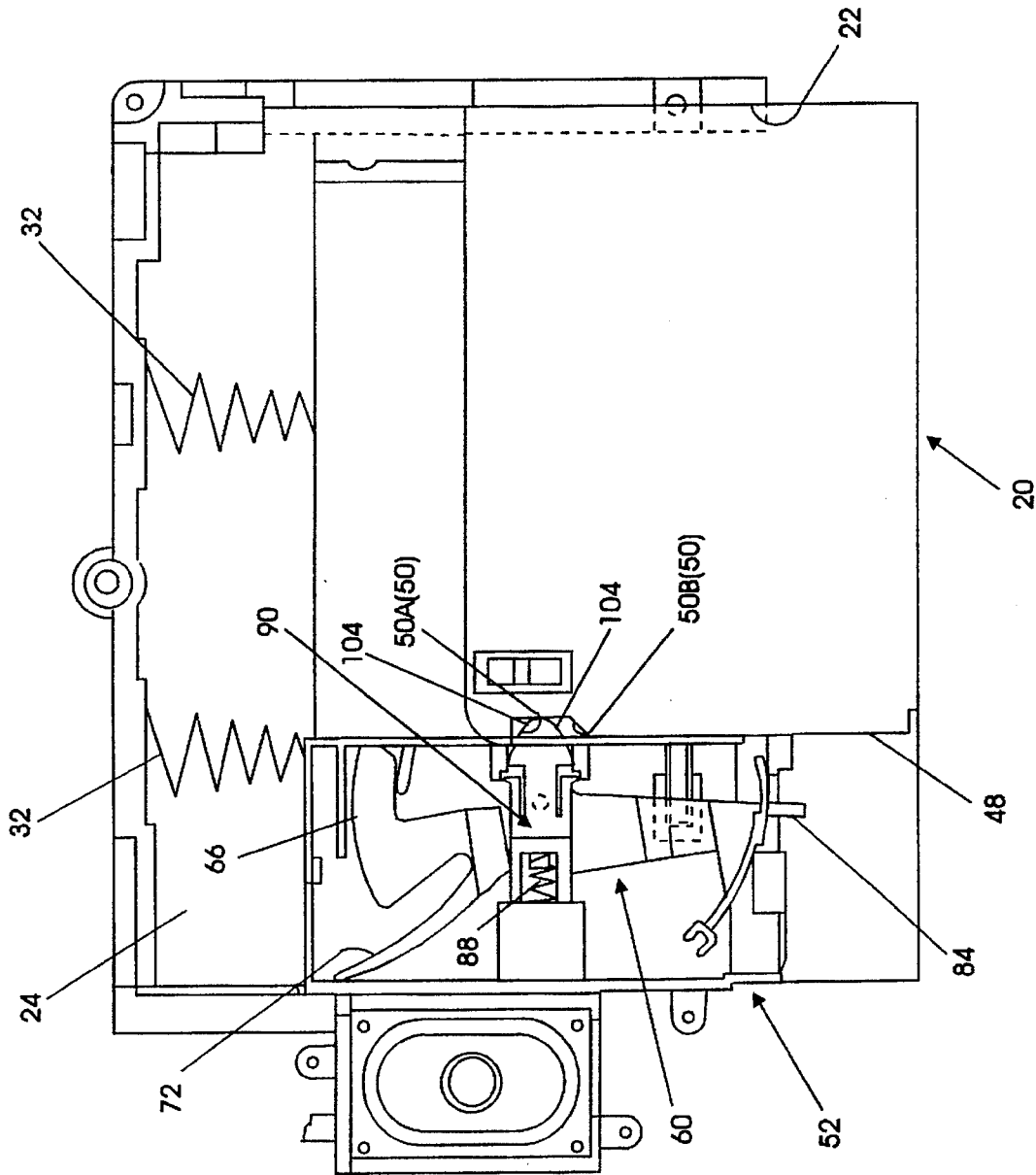
FIG. 6 is a plan view of the battery compartment apparatus and the side-loadable, slide-in battery in the partially loaded position with the plunger engaged in the battery recess.

When, as is shown in FIG. 6, the battery 20 is being removed and the recessed portion 50 reaches the position of the plunger 90, the plunger 90, which is driven by the spring 88, enters and engages the recessed portion 50 and stops the movement of the battery 20. Therefore, even if the battery 20 is being removed while the PC 10 is in an inclined position, the battery 20 will not slip out of the battery storage section 24.

Figure 7:
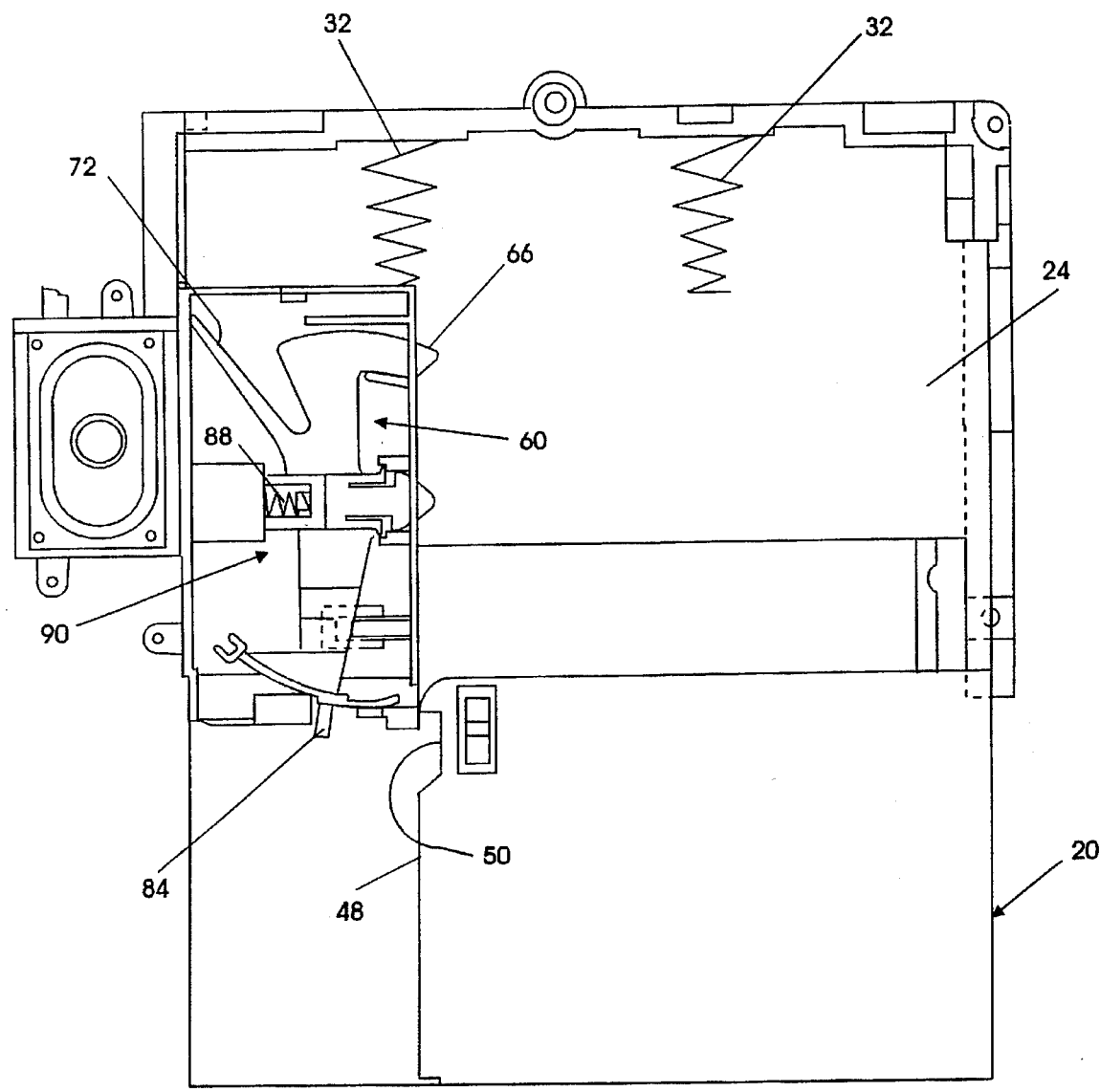
FIG. 7 is a plan view of the battery compartment apparatus and the side-loadable, slide-in battery in the unloaded position wherein neither the latch nor the plunger are engaged in the battery recess.

When the battery 20 is manually unloaded, the inclined face 104 of the plunger 90 is pushed back by the wall 50A of the recessed portion 50, and the plunger 90 is returned to the receptacle 52. Thus, as is shown in FIG. 7, the plunger 90 disengages the recessed portion 50, and the battery 20 can be removed from the battery storage section 24.

On the other hand, when the battery 20 is inserted through the insertion port 22 into the battery storage section 24, first, the corner of the battery 20 abuts upon the inclined face 104 of the plunger 90, and pushes the plunger 90 back into the receptacle 52 against the urging force of the spring 88. Then, when the recessed portion 50 has reached the plunger 90, the plunger 90 is forced into the recessed portion 50 by the urging force of the spring 88 and temporarily halts the movement of the battery 20.

When the battery 20 is inserted farther, the inclined face 104 of the plunger 90 is pushed back by the wall 50B of the recessed portion 50 and the plunger 90 is removed from the recessed portion 50 and comes into contact with the side face 48 of the battery 20.

As the battery 20 is inserted farther, the corner of the battery 20 then abuts upon the inclined face 66B of the latch portion 66 and pushes the latch portion 66 back into the receptacle 52 against the urging force of the cantilever spring 72. When the battery 20 is inserted farther, the recessed portion 50 reaches the latch portion 66, which is driven into the recessed portion 50 by the urging force of the cantilever spring 72 and engages and holds the battery 20 in the use position.

Since the latch portion 66, the distal end of the plunger 90, and the wall 50B of the recessed portion 50 are formed at predetermined angles, as described above, the insertion and extraction of the battery 20 is facilitated.

According to the present invention with the above described arrangement, after a battery that is in the use position is disengaged, the movement of the battery is temporarily halted during the unloading process. Thus, the battery will not fall out of the battery storage section.

We claim:

1. A computer for use with a side-loadable, slide-in battery having a recess in the side surface of the battery, wherein the recess includes a back wall substantially parallel to the side surface of the battery, a first side wall substantially perpendicular to the back wall, and a second side wall sloped at an obtuse angle relative to the back wall, said computer comprising:

a housing that includes a bottom surface and at least one side surface substantially perpendicular to said bottom surface, said side surface having an opening for receiving the side-loadable, slide-in battery;

a first mechanism for holding the battery in a fully loaded position wherein the battery is fully inserted into the housing, wherein said first mechanism includes a lever having a latch at a first end for engaging the battery recess a first spring for forcing said latch into the battery recess when the battery is fully loaded into the housing, and a knob at a second end of said lever which can be manually moved by an operator to extract said latch from the battery recess thereby releasing the battery from the fully loaded position, said first spring being a cantilever spring that is integrally formed as a part of said lever, wherein said lever rotates around a pin and a plunger holds said pin in position; and a second mechanism for holding the battery in a partially loaded position wherein the battery is partially inserted into the housing, and partially extending out of said housing, wherein said second mechanism includes said plunger for engaging the battery recess, and a second spring for forcing said plunger into the battery recess and to hold the battery in the partially loaded position said plunger having a sloped wall to permit the battery to be forcibly released from the partially loaded position and to be unloaded from the housing; said plunger being depressed and disengaged from the battery recess when the battery is forcibly loaded into the housing.

2. The computer of claim 1, further comprising a third spring for urging the battery from the fully loaded position towards the partially loaded position when said latch is disengaged from the battery recess.

3. A battery compartment apparatus for use with a battery, said battery compartment apparatus comprising:

a first mechanism for holding the battery in a fully loaded position wherein the battery is fully inserted into the battery compartment apparatus, wherein said first mechanism includes a lever having a latch at a first end for engaging a recess in the battery, a first spring for forcing said latch into the battery recess when the battery is fully loaded into the battery compartment apparatus, and a knob at a second end of said lever which can be manually moved by an operator to extract said latch from the battery recess, thereby releasing the battery from the fully loaded position said first spring being a cantilever spring that is integrally formed as a part of said lever, wherein said lever rotates around a pin and a plunger holds said pin in position; and a second mechanism for holding the battery in a partially loaded position wherein the battery is partially inserted into the battery compartment apparatus, wherein said second mechanism includes said plunger for engaging the battery recess, and a second spring for forcing said plunger into the battery recess and to hold the battery in the partially loaded position, said plunger having a sloped wall to permit the battery to be forcibly released from the partially loaded position and to be unloaded from the battery compartment apparatus.

4. The battery compartment apparatus of claim 3, further comprising a third spring for urging the battery from the fully loaded position towards the partially loaded position when said latch is disengaged from the battery recess.

* * * * *